(12) United States Patent
Jinno et al.

(10) Patent No.: US 6,798,572 B2
(45) Date of Patent: Sep. 28, 2004

(54) TRANSMISSION SCREEN SHEET AND TRANSMISSION SCREEN COMPRISING THE SAME

(75) Inventors: Masanao Jinno, Chiyoda-ku (JP); Masayoshi Miyauchi, Chiyoda-ku (JP); Makoto Honda, Shinjuku-ku (JP); Michihisa Ide, Shinjuku-ku (JP)

(73) Assignees: Teijin Chemicals, Ltd., Tokyo (JP); Dai Nippon Printing Co., Ltd., Tokyo (JP)

( * ) Notice: Subject to any disclaimer, the term of this patent is extended or adjusted under 35 U.S.C. 154(b) by 0 days.

(21) Appl. No.: 10/680,189

(22) Filed: Oct. 8, 2003

(65) Prior Publication Data
US 2004/0114228 A1 Jun. 17, 2004

(30) Foreign Application Priority Data
Oct. 9, 2002 (JP) ........................................ 2002-296087

(51) Int. Cl.$^7$ .......................... G03B 21/60; G02B 27/10
(52) U.S. Cl. ........................................ 359/456; 359/620
(58) Field of Search ................................ 359/455, 456, 359/457, 619, 620, 742; 264/1.7

(56) References Cited
U.S. PATENT DOCUMENTS 6,292,294 B1   9/2001  Takahashi et al. .......... 359/455
6,597,502 B2   7/2003  Takahashi et al. .......... 359/456

FOREIGN PATENT DOCUMENTS

| JP | 7-134338 | 5/1995 | ........... G03B/21/62 |
| JP | 9-11328 | 1/1997 | ........... B29C/59/04 |
| JP | 11-237692 | 8/1999 | ........... G03B/21/62 |
| JP | 2000-98499 | 4/2000 | ........... G03B/21/62 |

*Primary Examiner*—Russell Adams
*Assistant Examiner*—Melissa J Koval
(74) *Attorney, Agent, or Firm*—Wenderoth, Lind & Ponack, L.L.P.

(57) ABSTRACT

A transmission screen sheet which is given a large number of lens-like forms on the surface like ridges and has a thickness of 0.1 to 2.0 mm, wherein (i) the sheet is formed from a thermoplastic resin whose inclination (W) obtained from the relationship between melt viscosity (Y) and load (X) satisfies the following expression (1) when the melt viscosity is in the range of $10^2$ to $10^3$ Pa·s, and (i) the lens-like forms change in height substantially non-stepwise from the center portion or a portion near the center portion to the end portions of the sheet in a direction perpendicular to the ridges:

$$2\times 10^{-2} \leq W \leq 6\times 10^{-2} \qquad (1)$$

wherein W is represented by the following equation:

$$W = -(\log Y/X)$$

wherein X is a load (MPa) and Y is the melt viscosity (Pa·s) of the resin.

16 Claims, 1 Drawing Sheet

TRANSMISSION SCREEN SHEET AND TRANSMISSION SCREEN COMPRISING THE SAME

BACKGROUND OF THE INVENTION

1. Field of the Invention

The present invention relates to a transmission projection screen and a sheet for these screens.

2. Description of the Prior Art

Various measures have been taken for projection screens to diffuse light uniformly. For example, inorganic fine particles and organic polymer fine particles are contained in a resin sheet as a light diffusion agent, or special forms such as lens-like forms are given to the surface of a sheet to provide constant diffusion properties, which is widely seen nowadays.

To provide lens-like forms, a method of producing one by one in which an electron beam curable resin is poured into a metal mold having reverse forms to the lens-like forms and the obtained sheet is laminated with a plate-like molded product, and a continuous extrusion method in which a molten thermoplastic resin is shaped under a pressure with a roll having engraved reverse forms to the lens-like forms in a width direction (JP-A 9-11328) (the term "JP-A" as used herein means an "unexamined published Japanese patent applications") are employed.

Since a high-quality image has been desired for a projection screen, a method for changing diffusion properties by making lenticular forms at the center portion lower and lenticular forms at the end portions higher (JP-A 7-134338, JP-A 11-237692, JP-A 2000-98499and U.S. Pat. No. 6,292,294) and a method for reducing the thickness of a screen to suppress a double image caused by the reflection of the screen itself and reduce cost are being developed and studied.

SUMMARY OF THE INVENTION

It is an object of the present invention to produce a high-quality transmission screen sheet for use as a light diffusing sheet for transmission projection screens at a low cost.

The inventors of the present invention have found that the production of a light diffusing sheet having a small thickness by the continuous extrusion method is the most effective in improving the quality and reducing the cost of a transmission screen sheet at the same time. However, they have found that a melt bank becomes nonuniform in shape along the extrusion width because the melt bank is sandwiched between a pair of rolls under pressure while forming the melt bank in the continuous extrusion system using shaping rolls, thereby making uniform shaping impossible.

That is, when the bank is large in shape, the resin to be sandwiched becomes large in quantity and pressure force grows, thereby increasing shaping properties whereas when the bank is small in shape, the resin to be sandwiched becomes small in quantity and pressure force shrinks, thereby reducing shaping properties. Further, as the size of the melt bank always changes slightly when the extrusion molding method is employed, it is difficult to continuously stably give lens-like forms with this method using a roll having a fine uneven pattern.

Meanwhile, when a roll having engraved grooves which differ in shape, height or pitch in the width direction and a roll having engraved grooves which are uniform in shape, height and pitch in the width direction are compared with each other, it is extremely difficult to continuously stably give lens-like forms with the roll having engraved grooves which differ in shape, height or pitch in the width direction.

Further, when the screen sheet is reduced in thickness, it is easily solidified by cooling while it is curved. In the step of separating the resin sheet from the shaping roll and making it flat, the resin sheet must be heated by a heater to remove its distortion. However, fine cracking may occur during molding with a groove in the lens as a starting point.

The inventors of the present invention have conducted intensive studies to solve these problems and have found that even when a roll having engraved grooves which change in shape non-stepwise is used, desired lens-like forms can be obtained stably regardless of the state of a melt bank by using a thermoplastic resin having a specific range of pressure dependence in a molten state. The present invention has been accomplished based on this finding.

MEANS FOR SOLVING THE PROBLEMS

That is, according to the present invention, there is provided a transmission screen sheet which is given a large number of lens-like forms on the surface like ridges and has a thickness of 0.1 to 2.0 mm, wherein (i) the sheet is formed from a thermoplastic resin whose inclination (W) obtained from the relationship between melt viscosity (Y) and load (X) satisfies the following expression (1) when the melt viscosity is in the range of $10^2$ to $10^3$ Pa·s, and (ii) the lens-like forms change in height substantially non-stepwise from the center portion or a portion near the center portion to the end portions of the sheet in a direction perpendicular to the ridges:

$$2\times10^{-2} \leq W \leq 6\times10^{-2} \tag{1}$$

wherein W is represented by the following equation:

$$W = -(\log Y/X)$$

wherein X is a load (MPa) and Y is the melt viscosity (Pa·s) of the resin.

DETAILED DESCRIPTION OF THE PREFERRED EMBODIMENT

The transmission screen sheet of the present invention and a process for producing the same will be described in detail hereinbelow.

Figure 1:
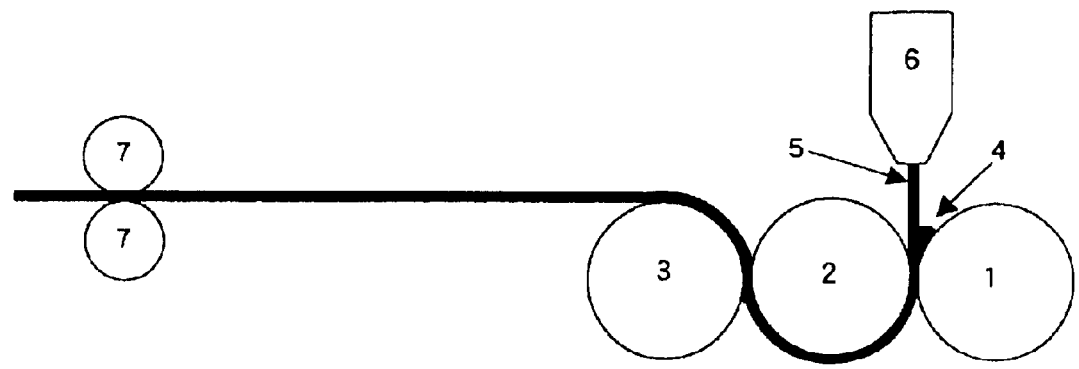
FIG. 1 is a schematic diagram showing an example of an apparatus for producing a transmission screen sheet according to the present invention.
Figure 2:
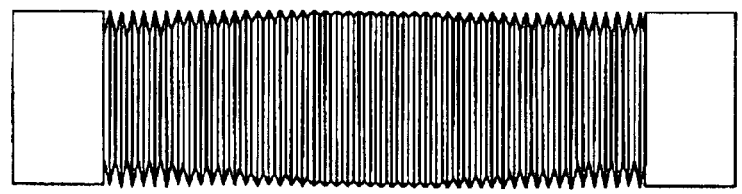
FIG. 2 is an enlarged view of a roll having engraved grooves shown in FIG. 1.
Figure 3:
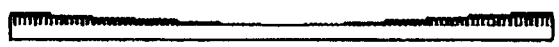
FIG. 3 is a sectional view of a transmission screen sheet according to the present invention.
Figure 4:
FIG. 4 is a sectional view of another transmission screen sheet according to the present invention.

The present invention is first described with reference to the drawings. FIG. 1 is a schematic diagram of an example of an apparatus for producing a transmission screen sheet in the present invention. In FIG. 1, reference numerals 1, 2 and 3 denote cooling rolls, either one of the cooling roll 1 and 2 or both of the cooling roll 1 and 2 has a large number of fine engraved ring grooves on the surface as shown in FIG. 2, and the other roll and the cooling roll 3 are ordinary rolls having a mirror surface. Reference numeral 4 represents a melt bank, 5 represents a melt extruded sheet-like resin, 6 represents T die lip and 7 represents a take-off roll. FIG. 2 is an enlarged view of the roll having engraved grooves shown in FIG. 1, and FIG. 3 is a sectional view of a transmission screen sheet of the present invention. Changes in height of the lens-like forms on the surface of the sheet in FIG. 3 roughly correspond to the shape of the roll having engraved grooves shown in FIG. 2. As for the lens-like forms on the surface of the sheet shown in FIG. 3, the positions of the valleys of the lens-like forms are almost at the same level in the thickness direction of the sheet, and the positions of the peaks of the mountains of the lens-like forms become higher from the center or a portion near the center portion toward the end portions. On the other hand, as for the lens-like forms on the surface of the sheet shown in FIG. 4 (an enlarged view of a roll having engraved grooves corresponding to this FIG. 4 is not given), the positions of the peaks of the mountains of the lens-like forms are almost at the same level in the thickness direction of the sheet and the positions of the valleys of the lens-like forms become lower from the center portion or a portion near the center portion toward the end portions. As a result, the lens-like forms become taller toward the end portions. Meanwhile, the surface on the opposite side to the surface having lens-like forms of the transmission screen sheet of the present invention is flat.

Describing the process for producing this transmission screen sheet, the thermoplastic resin is molten in an extruder and extruded into a sheet-like form through the T die lip 6, and the molten extruded sheet is cooled while it is sandwiched among the rolls 1, 2 and 3 under pressure. Fine lens-like forms are given to the sheet with engraved grooves formed on the surface of the roll 1 or 2, and the sheet is cooled and taken up by the take-up rolls 7. The diameters of the used rolls 1,2 and 3 are not particularly limited and do not need to be the same but they are generally the same and 200 mm or more, particularly preferably 250 to 500 mm.

The pitch of the engraved grooves of the used roll is preferably 40 to 150 $\mu$m, more preferably 50 to 100 $\mu$m. When the pitch is smaller than 40 $\mu$m, as the melt viscosity of the thermoplastic resin is high at the time of molding, the resin is not fully filled into the grooves under pressure, thereby making it substantially difficult to give lens-like forms. When the pitch is larger than 150 $\mu$m, the thermoplastic resin is easily filled into the grooves but it is easily influenced by shaping according to a difference in the shape of the melt bank, whereby the lens-like forms become unstable, thereby making it difficult to obtain stable quality as a substrate for a transmission screen.

The grooves of the roll having engraved grooves used in the present invention are as deep as 3 to 150 $\mu$m, preferably 5 to 100 $\mu$m. When the depth is smaller than 3 $\mu$m, engraving grooves on the roll becomes substantially nonouniform, thereby making it difficult to obtain target quality, and when the depth is larger than 150 $\mu$m, shaping properties do not change as the melt viscosity of the resin is high. The depth of each groove on the roll is designed in consideration of transferability to the sheet.

The pitch of the lens-like forms on the transmission screen sheet of the present invention depends on the pitch of the engraved grooves on the roll. The pitch of the lens-like forms is preferably 40 to 150 $\mu$m, more preferably 50 to 100 $\mu$m. A large number of lens-like forms desirably have the same pitch. That is, it is desired that a large number of lens-like forms having the same pitch should be formed on the sheet.

The heights of the lens-like forms differ according to the depths and pitch of the engraved grooves on the roll and the installation position of the engraved roll, and lens-like forms do not need to be given to the entire surface. For example, the center portion of the sheet may not have any lens-like form in an area of $\frac{1}{3}$ to $\frac{1}{100}$, preferably $\frac{1}{5}$ to $\frac{1}{1,000}$, more preferably $\frac{1}{10}$ to $\frac{1}{1,000}$ the width of the sheet product (this area is called "a portion around the center portion") and the end portions of the sheet may be given lens-like forms. The heights of the lens-like forms which differ according to the size of the screen are preferably 1 $\mu$m to 50 $\mu$m, more preferably 1 $\mu$m to 30 $\mu$m.

The relationship between the depth of the engraved groove of the roll and the height of the lens-like form is represented by transferability (height of lens-like form/depth of groove). The transferability is changed by the thickness of the sheet, molding temperature and molding pressure. The transferability increases as the thickness of the sheet becomes smaller and the molding temperature and the molding pressure become higher. The transferability is generally 20 to 90%.

Changes in height of the lens-like forms from the center portion or a portion around the center portion to the end portions are 0.01 to 0.5 $\mu$m/cm on the average and made non-stepwise.

The changes are values per cm obtained by selecting 8 mm-wide measurement areas at intervals of 5 cm and measuring the average height of each measurement area.

The lens-like forms preferably change in height from 0.01 to 0.5 $\mu$m/cm non-stepwise even when the interval between adjacent lens-like forms is gradually reduced from 5 cm (specifically to 3 cm, further 1 cm). It is ideal that the lens-like forms should become taller non-stepwise while they satisfy a change rate of 0.01 to 0.5 $\mu$m/cm.

The expression "non-stepwise changes" means that the lens-like forms change in height not stepwise but gradually and continuously as a whole. That is, it is not preferred that a large number of groups of lenses, each group having the same height, should be arranged regularly, namely stepwise changes. When the sheet is used as a screen, the stepwise changes may result in the formation of an optical contrast line on the screen.

The lens-like forms are preferably of a curved lenticular type, prism type having an isosceles triangular section, or linear-Fresnel type having the sectional form of a Fresnel lens arranged in one direction. To diffuse light uniformly, a lenticular type or a form having the properties of both lenticular and linear-Fresnel types is particularly preferred.

A case where the lens-like forms of the sheet of the present invention are lenticular forms will be described in more detail. The structure of a sheet having the lenticular forms is disclosed by JP-A 11-237692 and U.S. Pat. No. 6,292,294, for example. That is, when the lens-like forms are lenticular form, the heights of lenticular forms at the end portions are larger than the heights of lenticular forms at the center portion (including a portion near the center portion). By changing the lens-like forms in height, diffusion properties are continuously changed such that the diffusion angle at the end portion is made larger than the diffusion angle at the center portions. To make the diffusion angle at the center portion smaller than the diffusion angle at the end portions, the heights of lens-like forms at the center portion are made smaller than the heights of lens-like forms at the end portions by changing the curvature and outer shape of the unit lens-like form at the same pitch. An alternative method for changing the diffusion angle is to increase the pitch of lens-like forms having the same curvature gradually to raise the use ratio of the form. However, the pitch of the lenticular forms is desirably the same.

Figure 5:
FIG. 5 is a sectional view of still another transmission screen sheet of the present invention.

A description is subsequently given of the above lenticular forms with reference to the drawings, When the lens-like forms of the sheet of the present invention are lenticular forms, sectional views of examples of the sheet are given in FIGS. 3 and 4. In the sectional view of FIG. 3, the positions of the valleys of the lenticular forms are almost at the same level in the thickness direction of the sheet, and the positions of the peaks of the mountains of the lenticular forms become higher from the center toward the end portions. On the other hand, in the sectional view of FIG. 4, the positions of the peaks of the mountains of the lenticular forms are almost at the same level in the thickness direction of the sheet and the positions of the valleys of the lenticular forms become lower from the center portion toward the end portions. FIG. 5 is a sectional view of another example of the sheet having lenticular forms. In FIG. 5, the lenticular forms change in shape and height from the center portion toward the end portions of the sheet.

For the production of the sheet, the size of the melt bank is preferably adjusted to 1/100 or less the diameter of the rolls sandwiching the melt bank under pressure. When the shape of the bank is uniform in the width direction, the size of the bank is not particularly limited as far as the shaped sheet does not have a poor appearance. However, when the bank is too large, air may be contained in the bank and marks of air bubbles may be formed on the sheet. When the bank is too small, a poor appearance may be caused by thickness nonuniformity because the bank is not completely sandwiched under pressure. Means of adjusting the width of the melt bank is, for example, an automatic metering control method using a bank sensor composed of a radiation thermometer, video camera for detecting the width visually, optical fiber system, or method of adjusting the temperature of a dice visually or the interval between lips of a dice.

The thickness of the thus obtained transmission screen sheet is 0.1 to 2.0 mm. This thickness can be determined by adjusting the interval between the roll 1 and the roll 2. When the thickness is smaller than 0.1 mm, the interval between the roll 1 and the roll 2 becomes too small, whereby the rolls may be contacted to each other. When the thickness is larger than 2.0 mm, a double image is apt to be formed by internal reflection, and problems such as reductions in light transmission and brightness and boosted cost may occur disadvantageously. When the thermoplastic resin is a polycarbonate resin, the thickness of the sheet is preferably 0.2 to 1.5 mm, particularly preferably 0.3 to 1.0 mm.

The thermoplastic resin for forming the transmission screen sheet of the present invention is a resin whose inclination (W) obtained from the relationship between melt viscosity (Y, Pa·s) and load (X, MPa) satisfies the expression $2 \times 10^{-2} \leq W \leq 6 \times 10^{-2}$, preferably $2.5 \times 10^{-2} \leq W \leq 5.5 \times 10^{-2}$ when the melt viscosity is 102 to 103 Pa·s. The inclination (W) is represented by $[-(\log Y/X)]$.

The thermoplastic resin which has the above inclination (W) is a polycarbonate resin or the like. The polycarbonate resin is obtained by reacting a diphenol with a carbonate precursor by solution polymerization or melt polymerization. The diphenol is preferably 2,2-bis(4-hydroxyphenyl) propane (so-called "bisphenol A") but other diphenol may be used as part or all of the diphenol. Examples of the other diphenol include 1,1-bis(4-hydroxyphenyl)ethane, 1,1-bis (4-hydroxyphenyl)cyclohexane, 2,2-bis(4-hydroxy-3,5-dimethylphenyl)propane, 2,2-bis(4-hydroxy-3-methylphenyl)propane, bis(4-hydroxyphenyl)sulfide and bis (4-hydroxyphenyl)sulfone. The polycarbonate resin is preferably a resin which comprises bisphenol A in an amount of 50 mol % or more, particularly preferably 70 mol % or more of the total of all the diphenols. Examples of the carbonate precursor include phosgene, diphenyl carbonate, bischloroformates of the above diphenols, di-p-tolyl carbonate, phenyl-p-tolyl carbonate, di-p-chlorophenyl carbonate and dinaphthyl carbonate. Out of these, phosgene and diphenyl carbonate are particularly preferred.

Basic means for producing these is briefly described. A reaction using phosgene as the carbonate precursor (solution polymerization) is carried out in the presence of an acid binder and a solvent. Examples of the acid binder include alkali metal hydroxides such as sodium hydroxide and potassium hydroxide, and amine compounds such as pyridine. Examples of the solvent include halogenated hydrocarbons such as methylene chloride and chlorobenzene. A catalyst such as tertiary amine or quaternary ammonium salt may be used to promote the reaction. The reaction temperature is generally 0 to 40° C., and the reaction time is several minutes to 5 hours.

An ester exchange reaction (melt polymerization) using a carbonic acid diester as the carbonate precursor is carried out by stirring a diphenol component and a carbonic acid diester in a predetermined ratio in an inert gas atmosphere under heating and distilling out the formed alcohol or phenol. The reaction temperature which differs according to the boiling point of the formed alcohol or phenol is generally 120 to 350° C. The reaction is completed while the formed alcohol or phenol is distilled out under reduced pressure from its initial stage. A catalyst which is generally used in an ester exchange reaction may be used to promote the reaction. Examples of the carbonic acid diester used in the above ester exchange reaction include diphenyl carbonate, dinaphthyl carbonate, bis(diphenyl)carbonate, dimethyl carbonate, diethyl carbonate and dibutyl carbonate. Out of these, diphenyl carbonate is particularly preferred.

The polymerization degree of the polycarbonate resin is not particularly limited if its inclination W satisfies $2 \times 10^{-2} \leq W \leq 6 \times 10^{-2}$. A suitable molecular weight control agent, a branching agent for improving workability, catalyst for promoting the reaction, stabilizer such as a phosphorous acid ester, phosphoric acid ester or phosphonic acid ester, flame retardant such as tetrabromobisphenol A, a low molecular weight polycarbonate of tetrabromobisphenol A, decabromodiphenyl ether, colorant and lubricant may be optionally added to produce the polycarbonate resin.

The polycarbonate resin has a specific viscosity measured at 20° C. of preferably 0.25 to 0.7, more preferably 0.3 to 0.6 when 0.7 g of the resin is dissolved in 100 ml of methylene chloride.

The transmission screen sheet of the present invention is preferably formed from a thermoplastic resin composition (particularly a polycarbonate resin composition) which contains a particulate resin as a diffusing agent.

The particulate resin as a diffusing agent has an average particle diameter of preferably 1 to 50 μm, more preferably 3 to 30 μm. When the average particle diameter is smaller than 1 μm, the diffusion properties of the diffusing agent deteriorate and when the average particle diameter is larger than 50 μm, the surface becomes uneven due to the extremely large particle diameter, whereby the obtained product may be defective or glaring disadvantageously. The refractive index of the particulate resin is not particularly limited because it depends on the optical requirements of a transmission screen but it is generally 1.42 to 1.60, preferably 1.45 to 1.60, more preferably 1.50 to 1.60.

Examples of the particulate resin include partly crosslinked polymethacrylate resin and polystyrene resin. Preferred examples of the particulate resin include polymer fine particles based on partly crosslinked methyl methacrylate (MBX-5, MBX-20 of Sekisui Plastics Co., Ltd.), polymer fine particles based on partly crosslinked styrene (SBX-8 of Sekisui Plastics Co., Ltd.), polymer fine particles based on partially crosslinked stylene-acryl copolymer (GSM-8 of Ganz Chemical Co., Ltd.; SM10X-12JH and MS10X-120 of Sekisui Plastics Co., Ltd.) and polymer having core/shell morphology including a poly(butyl acrylate) core and a poly(methyl methacrylate) shell [Paraloyd EXL-5136 of Rohm and Harse Company]. The amount of the particulate resin which differs according to the thickness of the transmission screen sheet and the difference in refractive index between the thermoplastic resin and the particulate resin is preferably 0.01 to 2.0 parts by weight based on 100 parts by weight of the thermoplastic resin. When the amount of the particulate resin is larger than 2.0 parts by weight, the obtained sheet does not achieve the function of a transmission screen sheet due to extremely high diffusion properties.

The transmission screen sheet of the present invention may be subjected to an antistatic treatment to prevent the adhesion of dust. The antistatic treatment may be carried out by kneading an antistatic agent into the resin, applying an antistatic agent to a roll, or spraying it over the sheet while it is atomized.

The transmission screen sheet of the present invention is obtained by pouring a radiation curable resin into a metal mold having reverse forms to the form of a Fresnel lens layer or the like, laminating the obtained sheet with a rear side layer to the side having lens-like forms, and exposing the resulting laminate to radiation such as ultraviolet radiation to cure it, and advantageously used in a projection TV and the like as a Fresnel lens sheet for a transmission screen.

The transmission screen sheet of the present invention is advantageously used as a transmission screen sheet(s) (1) and/or (2) in a laminated transmission screen consisting of (1) a transmission screen sheet which is given lens-like forms on the surface like ridges, (2) a transmission screen sheet which is given lens-like forms on the surface like ridges (the direction of ridges of this sheet is perpendicular to that of the sheet (1)), and (3) a Fresnel lens layer arranged in a desired order. The order of arrangement is preferably (1), (2) and (3) or (1), (3) and (2) from side of an observer.

EFFECT OF THE INVENTION

According to the present invention, when a transmission screen sheet is to be produced by a metal bank system using rolls having grooves which change in shape regularly and non-stepwise in the width direction, a transmission screen sheet having highly accurate lens-like forms can be supplied easily and stably at a low cost by using a thermoplastic resin having a specific range of pressure dependence at a molding temperature. This sheet is very useful for transmission screens.

EXAMPLES

The following examples are given to further illustrate the present invention.

The inclination W was obtained by measuring the flow rate (cm$^3$/S) of a resin five times with a flow tester (CFT-500C of Shimadzu Corporation) at a temperature of 280° C., a nozzle diameter of 1.0 mm, a length of 10 mm and a load of 4.9 to 29.4 MPa (4.9 MPa, 9.8 Mpa, 19.6 Mpa, 29.4 MPa), obtaining melt viscosity (Pa·s) from each average value and drawing a graph plotting load (MPa) on the horizontal axis and the logarithm of melt viscosity (Pa·s) on the vertical axis.

The lens-like forms of the transmission screen sheet were measured with a tracer type surface roughness meter [Surfcom SE-1100 of Tokyo Seimitsu Co., Ltd.] at a cut-off value of 0.8 mm and a measurement length of 8 mm in the width direction (perpendicular to the direction of ridges). As for transferability, the configurations of the center portion and the both end portions in the width direction (1,000 mm) of the sheet were measured at 5 points having intervals of 5 cm in the extrusion direction with the above surface roughness meter to obtain the height of each lens-like form and the change ratio of height. The height of the lens-like forms was measured as 10-point average roughness RZ (difference between the average value of the heights of the five highest peaks measured from the reference line and the average value of the depths of the five deepest valleys measured from the reference line). The change ratio was calculated from the following equation.

change ratio (&)=[(maximum value−minimum value)/{(maximum value+minimum value)÷2}]×100

○ indicates that the change ratio of the height in each section is smaller than 5%, Δ indicates that the change ratio is 5 to 10%, and X indicates that the change ratio is larger than 10%.

The appearance of the screen was visually evaluated based on an image obtained when a transmission screen was produced by pouring a radiation curable resin into a metal mold subjected to Fresnel processing, joining the resulting molded layer to the non-shaped surface of a transmission screen sheet, curing the resulting laminate and actually setting it in a 50-inch projection TV. ○ indicates that the brightness of the screen is highly uniform and a double image cannot be seen, and X indicates that the center portion and end portions of the screen are not uniform in brightness and the end portions are dark, or a double image is seen on the screen.

Examples 1 to 7

Transmission screen sheets having a thickness of 0.2 to 1.0 mm were manufactured by an extruder provided with the apparatus shown in FIG. 1.

Organic fine particles shown in Table 2 were added in an amount shown in Table 1 to a polycarbonate resin (Example 1: specific viscosity of 0.450, Examples 2, 4–7 and Comparative Example 3: specific viscosity of 0.425, Example 3: specific viscosity of 0.365) which was obtained from a reaction between bisphenol A and phosgene using a T die lip having a width of 1,200 mm, two cooling rolls having a mirror surface and a diameter of 360 mm and a roll having engraved grooves and a diameter of 360 mm (the grooves were engraved such that the depth of a groove at the center was the smallest and the depth of each groove increased every pitch toward the end portions) and which had an inclination W shown in Table 1, and the resulting mixture was extruded into a sheet form at a cylinder temperature of 280° C. and a delivery rate from the T die lip of 300 kg/hr, sandwiched between the roll having engraved grooves and the cooling rolls having a mirror surface, molded by a melt bank system and taken up by take-up rolls to obtain transmission screen sheets shown in Table 1.

The temperatures of the cooling rolls 2 and 3 having a mirror surface were 120° C. and 140° C., and the temperature of the roll having engraved grooves was 110° C. The evaluation results are shown in Table 1. The obtained transmission screens were free from a dimensional change and a warp caused by moisture absorption and also from a double-image.

The heights of the lens-like forms of the sheet (width of 1,000 mm) obtained in Example 5 were measured in the width direction (perpendicular to the ridges) with the above tracer type surface roughness meter at a cut-off value of 0.8 mm, a measurement length of 8 mm and an interval of 5 cm. The results are shown in Table 3.

The height of the lens-like forms was measured as 10-point average roughness Rz (difference between the average value of the heights of the five highest peaks measured from the reference line and the average value of the depths of the five deepest valleys measured from the reference line).

Comparative Example 1

A transmission screen sheet shown in Table 1 was obtained under almost the same conditions as in Example 2 except that a methacryl·styrene copolymer resin having an inclination W of 0.235 (Estylene MS-800 of Nippon Steel Chemical Co., Ltd.) was used in place of the polycarbonate resin. The evaluation results are shown in Table 1. As obvious from the table, when W is high, the dependence on pressure of the resin becomes high. Therefore, the resin was greatly influenced by a change in the shape of the melt bank at the time of shaping and particularly, the change ratio in height of the lenticular forms at the end portions was large, and nonuniformity in the brightness of the obtained image was seen.

Comparative Example 2

A transmission screen sheet shown in Table 1 was obtained under almost the same conditions as in Example 5 except that a methacryl·styrene copolymer resin having an inclination W of 0.235 (Estylene MS-800 of Nippon Steel Chemical Co., Ltd.) was used in place of the polycarbonate resin. The evaluation results are shown in Table 1.

Comparative Example 3

A transmission screen sheet was obtained from a polycarbonate resin having the same inclination W as Example 2 except that its thickness was changed to 3.0 mm. The evaluation results are shown in Table 1. Since the thickness of the resin increased, a double image was seen and a slightly blurred low-contrast image was obtained as a whole.

TABLE 3-continued

| Measurement point (distance from one end) (cm) | The heights of the lens-like forms of the sheet ($\mu$m) |
|---|---|
| 20 | 5.2 |
| 25 | 4.6 |
| 30 | 3.9 |
| 35 | 2.7 |
| 40 | 2.1 |
| 45 | 1.8 |
| 50 | 1.5 |
| 55 | 1.9 |
| 60 | 2.8 |
| 65 | 3.3 |
| 70 | 4.4 |
| 75 | 4.8 |
| 80 | 5.4 |
| 85 | 5.8 |
| 90 | 6.3 |
| 95 | 6.4 |
| 100 | 7.2 |

What is claimed is:

1. A transmission screen sheet which is given a large number of lens-like forms on the surface like ridges and has a thickness of 0.1 to 2.0 mm, wherein (i) the sheet is formed from a thermoplastic resin whose inclination (W) obtained from the relationship between melt viscosity (Y) and load (X) satisfies the following expression (1) when the melt viscosity is in the range of $10^2$ to $10^3$ Pa·s, and (ii) the lens-like forms change in height substantially non-stepwise from the center portion or a portion near the center portion to the end portions of the sheet in a direction perpendicular to the ridges:

$$2 \times 10^{-2} \leq W \leq 6 \times 10^{-2} \quad (1)$$

wherein W is represented by the following equation:

$$W = -(\log Y/X)$$

TABLE 1

| | Inclination W | Thickness (mm) | Diffusion agent Type | Diffusion agent Amount (%) | Pitch of grooves in roll ($\mu$m) | Depth of grooves in roll ($\mu$m) Center portion | Depth of grooves in roll ($\mu$m) End portion | Pitch of lens-like forms ($\mu$m) | Height of lens-like form ($\mu$m) Center portion | Height of lens-like form ($\mu$m) End portion | Change ratio Center portion | Change ratio End portion | Appearance of screen Performance |
|---|---|---|---|---|---|---|---|---|---|---|---|---|---|
| Ex. 1 | 0.030 | 0.2 | A | 0.30 | 100 | 6.3 | 31.8 | 100 | 5.2 | 25.9 | ○ | ○ | ○ |
| Ex. 2 | 0.035 | 1.0 | A | 0.04 | 100 | 6.3 | 31.8 | 100 | 2.3 | 14.7 | ○ | ○ | ○ |
| Ex. 3 | 0.048 | 0.8 | A | 0.13 | 100 | 6.3 | 31.8 | 100 | 2.8 | 18.9 | ○ | ○ | ○ |
| Ex. 4 | 0.035 | 0.5 | A | 0.15 | 50 | 6.3 | 31.8 | 50 | 2.6 | 13.8 | ○ | ○ | ○ |
| Ex. 5 | 0.035 | 0.8 | B | 0.45 | 100 | 5.2 | 19.5 | 100 | 1.5 | 7.3 | ○ | ○ | ○ |
| Ex. 6 | 0.035 | 0.8 | B | 0.60 | 100 | 5.2 | 19.5 | 100 | 1.5 | 7.0 | ○ | ○ | ○ |
| Ex. 7 | 0.035 | 0.8 | C | 0.32 | 100 | 5.2 | 19.5 | 100 | 1.4 | 7.2 | ○ | ○ | ○ |
| C. Ex. 1 | 0.235 | 1.0 | A | 0.08 | 100 | 6.3 | 31.8 | 100 | 4.0 | 25.3 | Δ | x | x |
| C. Ex. 2 | 0.235 | 0.8 | B | 0.45 | 100 | 5.2 | 19.5 | 100 | 2.5 | 10.3 | Δ | x | x |
| C. Ex. 3 | 0.035 | 3.0 | A | 0.04 | 100 | 6.3 | 31.8 | 100 | 1.5 | 5.2 | ○ | ○ | x |

Ex. = Example
C. Ex. = Comparative Example

TABLE 2

| Diffusion agent | Product | Manufacturer | Refractive index | Average of particle diameter |
|---|---|---|---|---|
| Diffusion agent A | SM10X-12JH | Sekisui Plastics Co., Ltd. | 1.566 | 12 $\mu$m |
| Diffusion agent B | MS10X-12D | Sekisui Plastics Co., Ltd. | 1.530 | 12 $\mu$m |
| Diffusion agent C | G-SM8 | Ganz Chemical Co., Ltd. | 1.566 | 8 $\mu$m |

TABLE 3

| Measurement point (distance from one end) (cm) | The heights of the lens-like forms of the sheet ($\mu$m) |
|---|---|
| 0 | 7.3 |
| 5 | 6.5 |
| 10 | 6.1 |
| 15 | 5.8 | wherein X is a load (MPa) and Y is the melt viscosity (Pa·s) of the resin.

2. The transmission screen sheet of claim 1, wherein the pitch of the lens-like forms is 40 to 150 μm and the heights of the lens-like forms range from 1 to 30 μm.

3. The transmission screen sheet of claim 1, wherein the large number of lens-like forms have the same pitch.

4. The transmission screen sheet of claim 1, wherein the lens-like forms are of a lenticular type, prism type or linear-Fresnel type.

5. The transmission screen sheet of claim 1, wherein the lens-like forms are of a lenticular type.

6. The transmission screen sheet of claim 1, wherein the lens-like forms have properties of a lenticular type, prism type, linear-Fresnel type or both lenticular and linear-Fresnel type.

7. The transmission screen sheet of claim 1, wherein the thermoplastic resin is a polycarbonate resin.

8. The transmission screen sheet of claim 1, wherein the lens-like forms change in height non-stepwise by 0.01 to 0.5 μm/cm from the center portion or a portion around the center portion toward the end portions of the sheet.

9. The transmission screen sheet of claim 1, wherein the sheet is formed from a composition containing a particulate resin having an average particle diameter of 1 to 50 μm in an amount of 0.01 to 2.0 parts by weight based on 100 parts by weight of the thermoplastic resin.

10. The transmission screen sheet of claim 9, wherein the particulate resin has a refractive index of 1.42 to 1.60.

11. A transmission screen comprising the sheet of claim 1 as one element of a composite sheet.

12. A transmission Fresnel lens sheet which has a Fresnel lens layer on the rear side opposite to the side having a large number of lens-like forms of the transmission screen sheet of claim 1.

13. A transmission screen comprising (1) a transmission screen sheet given a large number of lens-like forms on the surface like ridges, (2) a transmission screen sheet given a large number of lens-like forms on the surface like ridges (the direction of ridges of this sheet is perpendicular to that of the sheet (1)), and (3) a Fresnel the transmission screen sheet(s) (1) and/or (2) being the claim 1.

14. A projection TV comprising the transmission screen of claim 11 as a screen.

15. A projection TV comprising the sheet of claim 12 as a screen.

16. A projection TV comprising the transmission screen of claim 13 as a screen.

\* \* \* \* \*